(12) United States Patent
Iwabuchi et al.

(10) Patent No.: US 11,148,476 B2
(45) Date of Patent: Oct. 19, 2021

(54) TIRE

(71) Applicant: BRIDGESTONE CORPORATION, Tokyo (JP)

(72) Inventors: Sotaro Iwabuchi, Tokyo (JP); Takayuki Fukunaga, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 448 days.

(21) Appl. No.: 16/072,198

(22) PCT Filed: Jan. 24, 2017

(86) PCT No.: PCT/JP2017/002410
§ 371 (c)(1),
(2) Date: Jul. 24, 2018

(87) PCT Pub. No.: WO2017/130986
PCT Pub. Date: Aug. 3, 2017

(65) Prior Publication Data
US 2019/0023081 A1    Jan. 24, 2019

(30) Foreign Application Priority Data
Jan. 25, 2016 (JP) .............................. JP2016-011878

(51) Int. Cl.
*B60C 13/00* (2006.01)
*B60C 11/13* (2006.01)
*B29D 30/72* (2006.01)

(52) U.S. Cl.
CPC .......... *B60C 13/001* (2013.01); *B60C 13/003* (2013.01); *B29D 30/72* (2013.01); *B60C 11/1315* (2013.01); *B60C 2011/1361* (2013.01)

(58) Field of Classification Search
CPC . B60C 13/001; B60C 13/003; B60C 11/1315; B60C 2011/1361; B29D 30/72
See application file for complete search history.

(56) References Cited

U.S. PATENT DOCUMENTS 6,253,815 B1 * 7/2001 Kemp ...................... B44F 1/02
152/523
2011/0285064 A1   11/2011 Ohara
(Continued)

FOREIGN PATENT DOCUMENTS

| CN | 104057787 A | 9/2014 |
|----|-------------|--------|
| DE | 10064093 C1 | 5/2002 |

(Continued)

OTHER PUBLICATIONS

Apr. 18, 2017 International Search Report issued in International Patent Application No. PCT/JP2017/002410.
(Continued)

*Primary Examiner* — Matthew J Daniels
*Assistant Examiner* — Shibin Liang
(74) *Attorney, Agent, or Firm* — Oliff PLC

(57) ABSTRACT

A tire includes a pattern portion that is formed on a tire surface and in which ridges are arranged in a nest shape having a center point, the ridges including ridgelines CL having a curved portion in plan view, in which a height of each of the ridges is from 0.2 mm to 0.5 mm, and adjacent ridges are arranged at a constant pitch of from 0.15 mm to 0.35 mm.

2 Claims, 11 Drawing Sheets

(56) References Cited

U.S. PATENT DOCUMENTS

| | | | |
|---|---|---|---|
| 2012/0318423 A1 | 12/2012 | Yamakawa | |
| 2014/0166177 A1* | 6/2014 | Muhlhoff | B60C 13/001 |
| | | | 152/523 |
| 2014/0283968 A1* | 9/2014 | Matsumoto | B60C 13/001 |
| | | | 152/523 |
| 2016/0152095 A1 | 6/2016 | Berger et al. | |
| 2017/0259623 A1 | 9/2017 | Matsumoto | |

FOREIGN PATENT DOCUMENTS

| | | | |
|---|---|---|---|
| DE | 102008037483 | * 10/2008 | B60C 13/00 |
| EP | 2105325 A4 | 3/2010 | |
| FR | 3007324 A1 | 12/2014 | |
| JP | 2002-522294 A | 7/2002 | |
| JP | 2008-126699 A | 6/2008 | |
| JP | 2014-136487 A | 7/2014 | |
| JP | 2014-180947 A | 9/2014 | |
| WO | 2012/131089 A1 | 10/2012 | |
| WO | 2014/005784 A1 | 1/2014 | |

OTHER PUBLICATIONS

Nov. 19, 2018 Extended European Search Report issued in European Patent Application No. 17744216.7.
Sep. 30, 2019 Search Report issued in Chinese Patent Application No. 2017800079867.

* cited by examiner

FIG.9

TABLE 1

| | | TIRE1 | TIRE2 | TIRE3 | TIRE4 | TIRE5 | TIRE6 |
|---|---|---|---|---|---|---|---|
| | PROTRUDING HEIGHT | 0.1 | 0.2 | 0.3 | 0.4 | 0.5 | 0.6 |
| | CENTER INTERVAL | 0.2 | 0.2 | 0.2 | 0.2 | 0.3 | 0.3 |
| | ANGLE | 25 | 25 | 25 | 25 | 25 | 25 |
| | VISIBILITY | C(5) | B(13) | A(18) | A(20) | A(18) | B(12) |
| | MOLDABILITY | A | A | A | A | B | C |

FIG.10

TABLE 2

| | TIRE1 | TIRE2 | TIRE3 | TIRE4 | TIRE5 | TIRE6 | TIRE7 |
|---|---|---|---|---|---|---|---|
| PROTRUDING HEIGHT | 0.35 | 0.35 | 0.35 | 0.35 | 0.35 | 0.35 | 0.35 |
| CENTER INTERVAL | 0.1 | 0.15 | 0.2 | 0.25 | 0.3 | 0.35 | 0.4 |
| ANGLE | 17 | 24 | 25 | 25 | 25 | 25 | 25 |
| VISIBILITY | B(12) | A(18) | A(20) | A(18) | A(18) | B(16) | B(12) |
| MOLDABILITY | C | B | A | A | A | A | A |

FIG.11

TABLE 3

| | | TIRE1 | TIRE2 | TIRE3 | TIRE4 | TIRE5 | TIRE6 | TIRE7 |
|---|---|---|---|---|---|---|---|---|
| | PROTRUDING HEIGHT | 0.35 | 0.35 | 0.35 | 0.35 | 0.35 | 0.35 | 0.35 |
| | CENTER INTERVAL | 0.2 | 0.2 | 0.2 | 0.2 | 0.2 | 0.3 | 0.4 |
| | ANGLE | 10 | 15 | 20 | 25 | 30 | 40 | 50 |
| | VISIBILITY | B(12) | A(18) | A(20) | A(19) | A(18) | B(16) | C(5) |
| | MOLDABILITY | C | B | A | A | A | A | A |

TIRE

TECHNICAL FIELD

The present disclosure relates to a tire on which representation such as characters are formed.

BACKGROUND ART

International Publication No. 2012/131089 discloses a technique in which a pattern portion configured by a plurality of protrusions is formed on a surface of a tire side portion to generate a contrast between the pattern portion and a smooth portion adjacent to the pattern portion, thereby improving visibility of the pattern portion.

SUMMARY OF INVENTION

Technical Problem

However, in a case in which the pattern portion is configured by extending the protrusions in one direction as in the technique disclosed in International Publication No. 2012/131089, when a viewing angle is changed, the pattern portion may not be uniformly viewed. For this reason, it has been demanded to further improve visibility of the pattern portion.

In consideration of the above facts, the disclosure aims to improve visibility of a pattern portion by controlling reflection of light incident to the pattern portion from each direction.

Solution to Problem

A tire according to a first aspect of the disclosure includes a pattern portion that is formed on a tire surface and in which ridges are arranged in a nest shape having a center point, the ridges including ridgelines having a curved portion in plan view, wherein a height of each of the ridges is from 0.2 mm to 0.5 mm, and adjacent ridges are arranged at a constant pitch of from 0.15 mm to 0.35 mm.

In the tire according to the first aspect of the disclosure, the pattern portion in which the ridges are arranged in the nest shape is formed on the tire surface, the ridges including the ridgelines having the curved portion (for example, a curved line part, a bent portion) in plan view. Here, the "tire surface" refers to a surface visible from the outside of the tire, such as a tire side portion, a tread portion, a groove bottom of a tread, or a groove wall. In addition, the tire includes both of a pneumatic tire and a non-pneumatic tire (so-called solid tire). It is to be noted that the term "ridge" refers to a protruding portion extending to be elongated along the tire surface. In addition, "the pattern portion in which the ridges are arranged in the nest shape having the center point" refers to a state in which a plurality of ridges having the same shape and different sizes are radially arranged adjacent to each other around an arbitrary point, and refers to a superposed structure such as a state in which a plurality of ridges are arranged adjacent to each other in a radial direction of a circle along circular arcs arranged on concentric circles, a state in which the ridges are arranged so as to be wounded in a spiral shape (that is, a vortex shape) around an arbitrary point, a state in which a plurality of ridges drawing contour lines of large and small figures having similar shapes are arranged so as to be incorporated with each other while sharing the center point, and the like.

The pattern portion is configured by arranging ridges having a height dimension from 0.2 mm to 0.5 mm in a nest shape having a center point, and the ridges adjacent to each other are arranged at a pitch of from 0.15 mm to 0.35 mm. For this reason, when light is incident between the wall surfaces of the adjacent ridges, the light is repeatedly reflected between the wall surfaces and is gradually attenuated. In this way, it is possible to suppress reflection of the light incident to the pattern portion.

Since the ridges adjacent to each other are arranged at a constant pitch, unevenness of reflected light is less likely to occur, as compared with, for example, a case in which the pitches are uneven. Further, the ridges can be densely arranged. For this reason, an effect of suppressing the reflection of the light is enhanced.

In addition, the ridgelines of the ridge have the curved portion when viewed on the plane. For this reason, the ridges can efficiently attenuate light incident from different directions. In this way, it is possible to suppress reflection of the light incident to the ridges from each direction. In addition, since the ridgelines of the ridges have the curved portions when viewed on the plane, the ridges can partially enhance the reflection of the light.

Further, in the pattern portion, the plurality of ridges having the same shape and different sizes are arranged radially around an arbitrary point. Therefore, the pattern portion appears to emit brilliance from the center point of a circle regardless of a direction in which it is viewed. In this manner, the visibility of the pattern portion can be improved by controlling the reflection of the light.

A tire according to a second aspect of the disclosure, in the tire according to the first aspect, the angle formed by the wall surfaces that configure ridges and facing each other is set to be from 15° to 40°.

According to the tire of the second aspect of the disclosure, when the angle formed by the wall surfaces is larger than 15°, a ratio in which reflected light from the wall surfaces returns from a space between the ridges to the outside is increased, such that improvement of visibility is suppressed. That is, the light is reflected, such that a difference in contrast with the bright portion is reduced, thereby suppressing the improvement of the visibility. Meanwhile, when the angle θ is smaller than 15°, the ridges easily collapse.

A tire according to a third aspect of the disclosure, in the tire according to the first and second aspects, the ridgelines form a circle shape.

According to the tire of the third aspect of the disclosure, since the ridgelines of the ridges are along the circle, the ridges include wall surfaces of which an extending direction is almost perpendicular to the incident light and wall surfaces of which an extending direction is almost parallel to the incident light. The number of times of reflection of the light between wall surfaces of which the extending direction is almost perpendicular to the incident light is increased, such that an attenuation effect of the light is high. In addition, the number of times of reflection of the light between the wall surfaces of which the extending direction is almost parallel to the incident light is decreased, such that an attenuation effect of the light is low as compared with the wall surfaces of which the extending direction are approximately perpendicular to the incident light. For this reason, the pattern portion includes parts in which the attenuation effect of the light is high and parts in which the attenuation effect of the light is low. A contrast is generated in reflected light from the pattern portion by controlling the reflection of the light as described above, such that the pattern portion appears to emit brilliance from the center of a circle regardless of a direction in which it is viewed. Therefore, visibility of the pattern portion is enhanced.

Advantageous Effects of Invention

According to the disclosure, it is possible to improve the visibility of the pattern portion by controlling the reflection of the light incident to the pattern portion from each direction.

BRIEF DESCRIPTION OF DRAWINGS

FIG. 9 is Table 1 showing results of test examples.
FIG. 10 is Table 2 showing results of test examples.
FIG. 11 is Table 3 showing results of test examples.

DESCRIPTION OF EMBODIMENTS

First Embodiment

Figure 1:
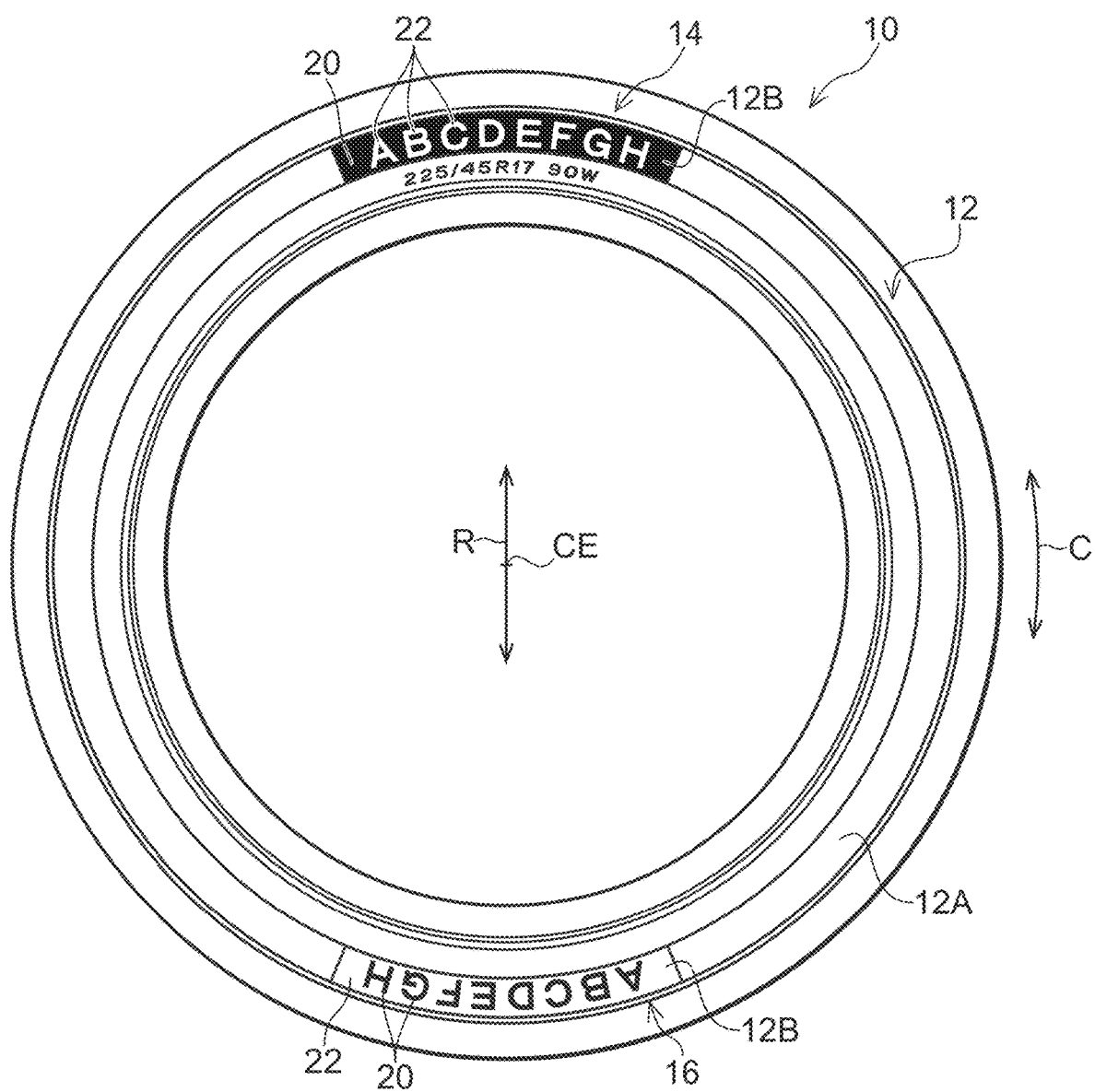
FIG. 1 is a side view of a tire according to an embodiment of the disclosure.

Hereinafter, a first embodiment of the disclosure will be described with reference to the drawings. In FIG. 1, a side view of a tire 10 according to the present embodiment is shown. In the present embodiment, C refers to a circumferential direction of the tire, and R refers to a radial direction of the tire. The tire 10 may be a pneumatic tire or may be a non-pneumatic tire.
(Mark Portion)

A first mark portion 14 and a second mark portion 16 that form representation are formed on a tire side portion 12 (decorative portion) which configures a tire surface. The first mark portion 14 and the second mark portion 16 have belt-like arc shapes, and are formed symmetrically with respect to a center axis CE of the tire. In addition, the first mark portion 14 and the second mark portion 16 have dark portions 20 looking black in appearance and bright portions 22 looking brighter than the dark portions 20, respectively. It is preferable that the first mark portion 14 and the second mark portion 16 are arranged outside a maximum width portion (that is, a part in which a linear distance between the tire side portions is the maximum) of the tire in the radial direction of the tire.

In the first mark portion 14 provided on an upper side of the page space of FIG. 1, the bright portion 22 is configured by characters such as "ABCDEFGH" formed of a smooth surface, and the dark portion 20 is formed at an outer circumferential portion of the bright portion 22. The dark portion 20 is a kind of decorative band, and is formed so as to surround the characters formed by the bright portion 22.

Meanwhile, in the second mark portion 16 provided on a lower side of the page space of FIG. 1, characters such as "ABCDEFGH" are formed by the dark portion 20, and an outer circumferential portion of the dark portion 20 is configured by the bright portion 22. In the second mark portion 16, the bright portion 22 configures a kind of decorative band, and is provided so as to surround the characters formed by the dark portion 20. The bright portion 22 is configured by a smooth surface like a general surface 12A which configures a surface of the tire side portion 12 other than the mark portion, and the bright portion 22 is configured by a step surface 12B recessed inward from the general surface 12A.

Figure 2:
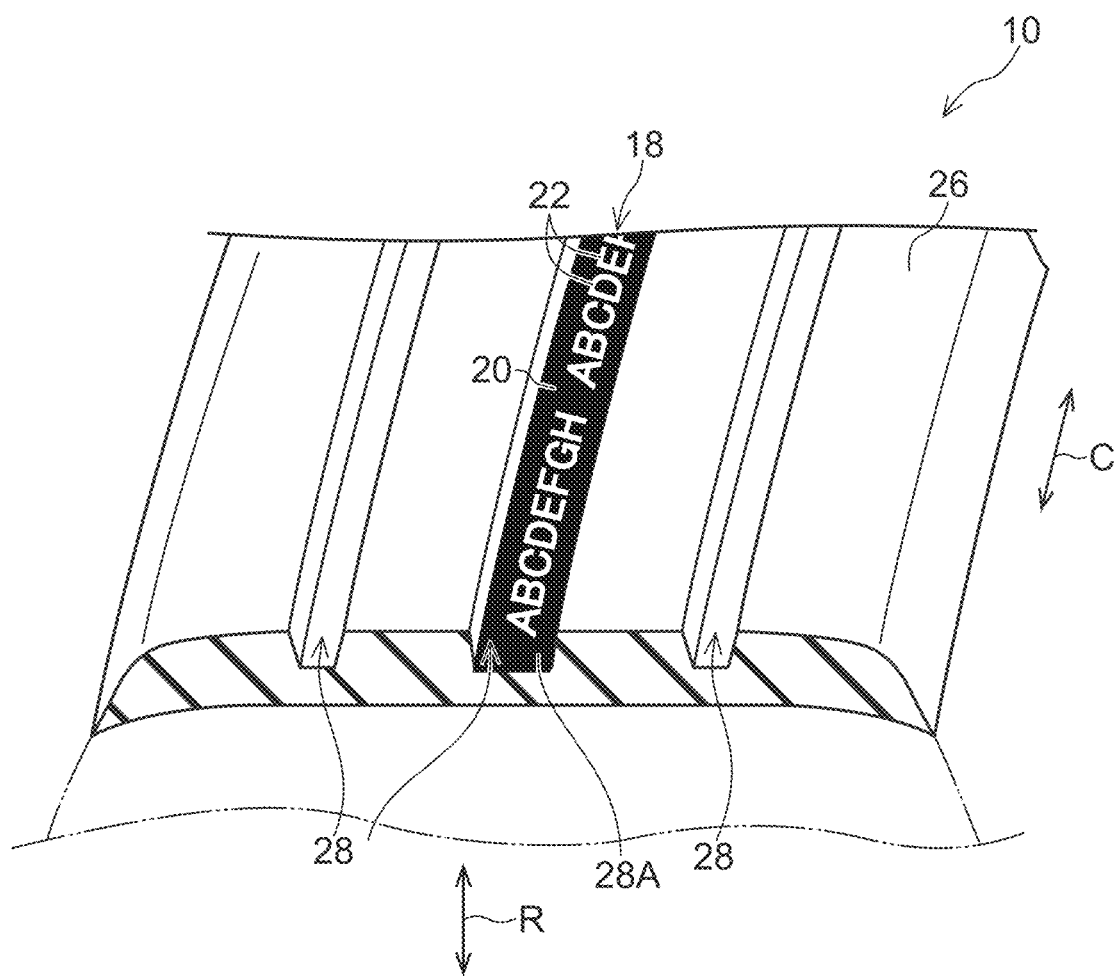
FIG. 2 is a partial perspective cross-sectional view of a tread of the tire according to the embodiment of the disclosure.

In addition, the tire 10 includes a tread 26 at an outer side in the radial direction R of the tire, as shown in FIG. 2. In the tread 26, a plurality of circumferential grooves 28 are formed. A third mark portion 18 forming representation is formed on a groove bottom 28A (decorative portion) of the circumferential grooves 28 which configures the tire surface. The third mark portion 18 has a belt-like shape, and is formed on a part of the circumferential groove 28. The third mark portion 18 also has a dark portion 20 looking black in appearance and a bright portion 22 looking brighter than the dark portion 20.

In the third mark portion 18, the bright portion 22 is configured by characters such as "ABCDEFGH" formed of a smooth surface, and the dark portion 20 is formed at an outer circumferential portion of the bright portion 22. The dark portion 20 is a kind of decorative band, and is formed so as to surround the characters formed by the bright portion 22.

The first mark portion 14, the second mark portion 16, and the third mark portion 18 including the dark portions 20 can be formed by providing corresponding protrusions and recesses in a mold of the tire 10 by laser processing.
(Pattern Portion)

Figure 3:
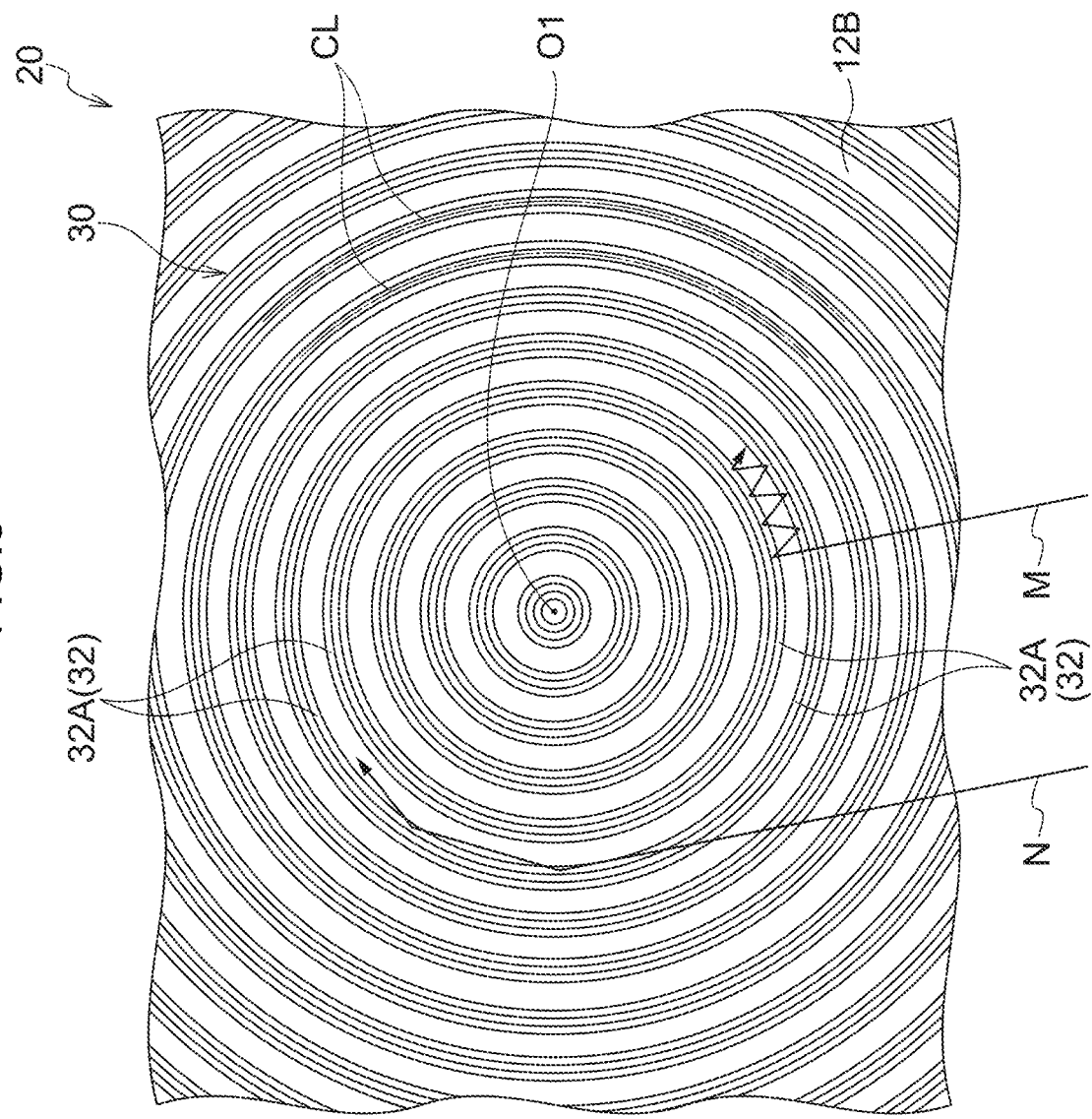
FIG. 3 is a plan view showing an example of a dark portion of a tire according to a first embodiment of the disclosure.

The dark portion 20 of the first mark portion 14 is configured by a pattern portion 30 formed on the step surface 12B recessed inward from the general surface 12A (see FIG. 1) of the tire side portion 12, as shown in FIG. 3. The pattern portion 30 is configured by arranging ridges 32 including ridgelines CL having a shape along a circle when viewed on a plane in a nest shape around a point O1.

Figure 7:
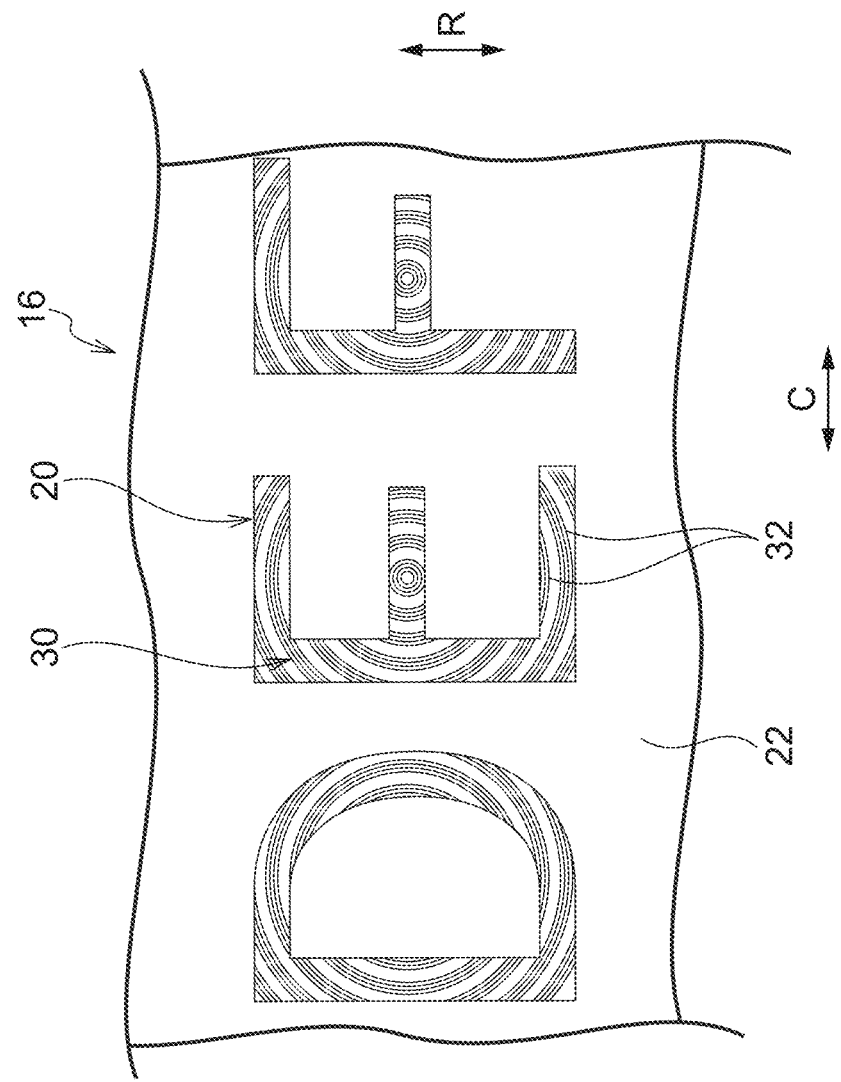
FIG. 7 is an enlarged plan view of a part of a second mark portion of the tire according to the present embodiment.
Figure 8:
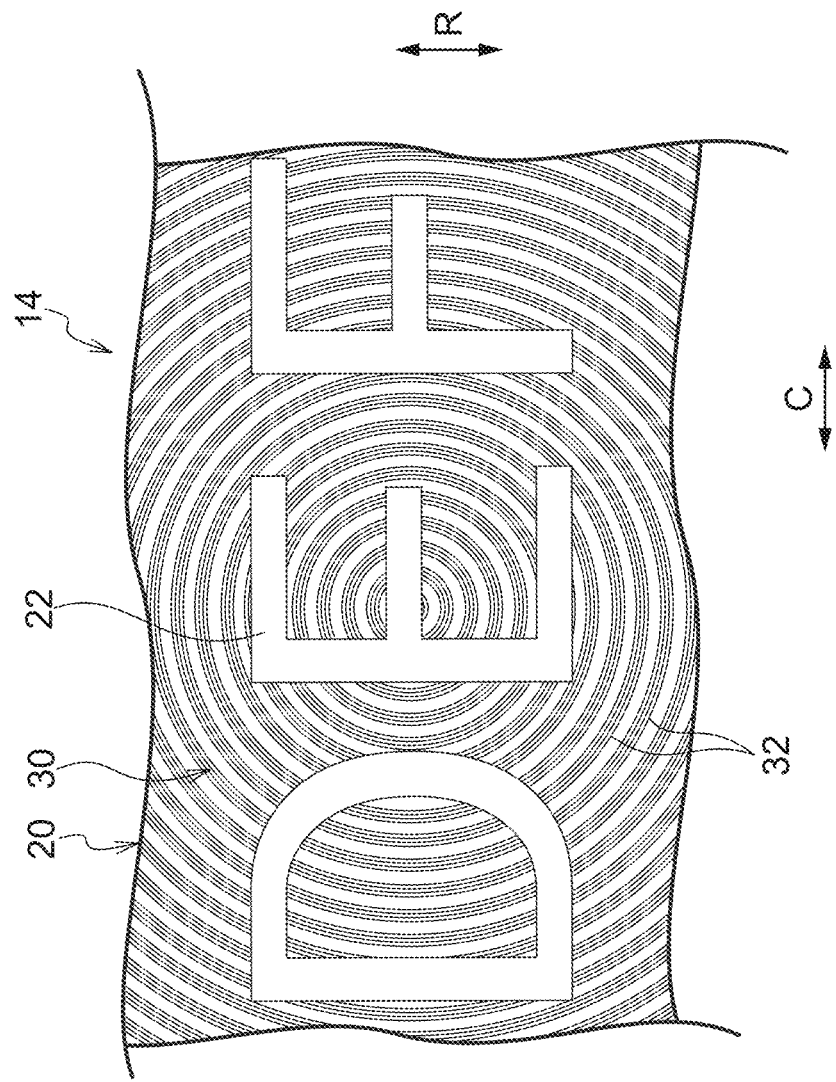
FIG. 8 is an enlarged plan view of a part of a first mark portion of the tire according to the present embodiment.

The dark portion 20 in the first mark portion 14 is formed so as to surround the characters formed by the bright portion 22, as shown in FIG. 8. Meanwhile, in the dark portion 20 in the second mark portion 16, as shown in FIG. 7, the characters are formed by the dark portion 20, and the bright portion 22 is formed so as to surround the characters. Although these ridges 32 have a "shape along a circle", it does not necessarily have to be a "circle". In FIG. 3, in order to allow a configuration to be easily understood, representation of the characters is omitted and the ridges 32 having a circular shape are arranged in the nest shape. However, the ridges 32 according to the present embodiment are not limited to having the circular shape, but may have various shapes other than straight line segments, such as an arc shape, an elliptical shape, a shape corresponding to a part of an ellipse, a polygonal shape, a polygonal line shape, and a wavy line shape. That is, it is preferable that each of the ridgelines has a curved portion (for example, a curved line part, a bent portion) when viewed on a plane. In addition, in the pattern portion 30, it is preferable that the ridges including the ridgelines drawing these shapes and a plurality of similar ridges including ridgelines having shapes similar to those of the ridgelines are arranged adjacent to each other.

The second mark portion 16 and the third mark portion 18 have the same structure as the structure described above. The same goes for the following description.

(Ridge)

Figure 6:
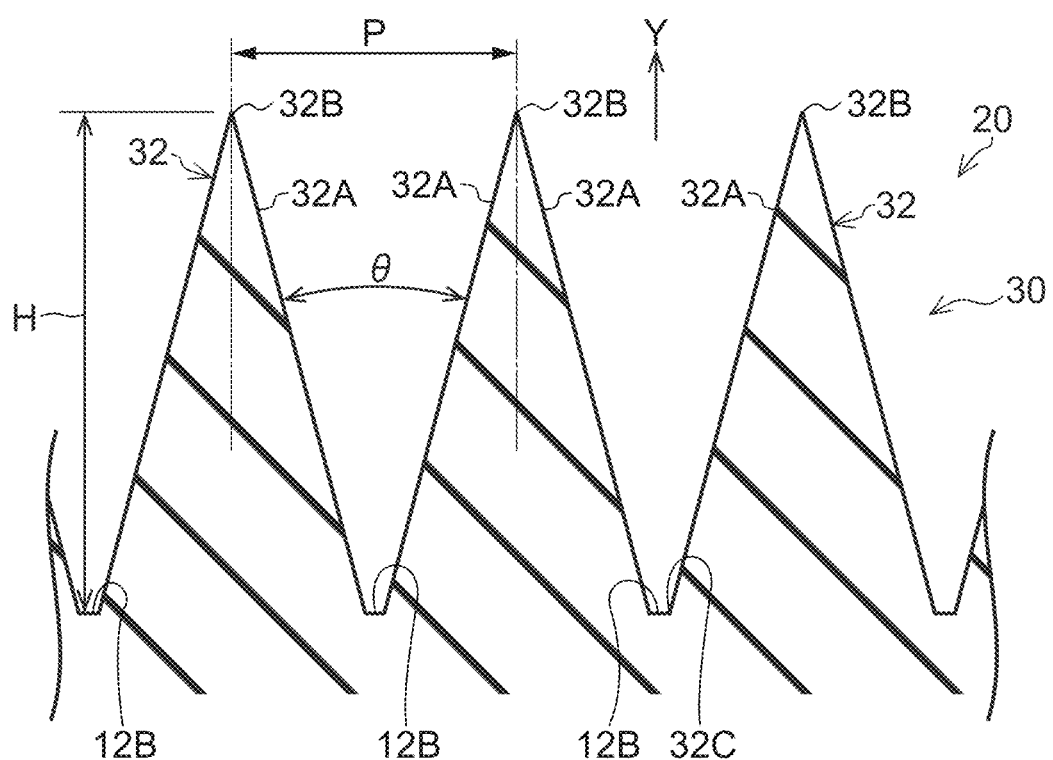
FIG. 6 is an enlarged cross-sectional view of ridges which configure the dark portion according to the first embodiment of the disclosure.

As shown in FIG. 6, wall surfaces 32A of both sides of the ridge 32 are inclined with respect to a protruding direction (a direction shown by an arrow Y in FIG. 6) so that an interval between the wall surfaces 32A of both sides of the ridge 32 is gradually increased from a top portion 32B toward a base portion 32C when viewed from a cross section in a direction orthogonal to an extending direction of the ridge 32. Further, in the present embodiment, the wall surfaces 32A of the ridge 32 continuously extend in a straight line shape from the top portion 32B to the base portion 32C. It should be noted that the "base portion 32C" mentioned herein refers to a boundary part between the ridge 32 and the step surface 12B.

The top portion 32B is a vertex having a pointed shape when viewed from the cross section in the direction orthogonal to the extending direction of the ridge 32, and a height H of the ridge 32, that is, a dimension of the ridge 32 from the top portion 32B to the step surface 12B in the radial direction of the tire is set to be from 0.3 mm to 0.4 mm. It should be noted that a case in which the height H of the ridge 32 is set to be from 0.3 mm to 0.4 mm is described in the present embodiment, but the embodiment of the disclosure is not limited thereto. For example, this height H can be in a range from 0.2 mm to 0.5 mm, and it is possible to obtain a predetermined effect as long as the height H is in this range.

The dark portion 20 is configured to look dark by repeatedly reflecting and attenuating light between a wall surface 32A of one ridge 32 and a wall surface 32A of another ridge 32, in a space between adjacent ridges 32.

In this case, when the height H of the ridge 32 is less than 0.3 mm, an effect in which the dark portion 20 looks black starts to be decreased, and when the height H is less than 0.2 mm, this effect is significantly decreased. Meanwhile, when the height H of the ridge 32 exceeds 0.4 mm, it is easy for the ridge 32 to be deformed due to an external force, and when the height H exceeds 0.5 mm, it is difficult to ensure moldability in a manufacturing process.

For this reason, it is preferable that the height H of the ridge 32 is set to be from 0.2 mm to 0.5 mm and it is more preferable that the height H is set to be from 0.3 mm to 0.4 mm.

Pitches P between adjacent ridges 32 are set to be equidistant pitches from 0.2 mm to 0.3 mm. The pitch P is represented by a separation distance between the ridgelines CL of the ridges 32. The ridgeline CL is the center line of the top portion 32B (in other words, a line along the extending direction of the ridge 32), and is denoted by alternated long and short dash lines in FIG. 3.

It should be noted that a case in which the pitch P between the ridges 32 is set to be from 0.2 mm to 0.3 mm is described in the present embodiment, but the embodiment of the disclosure is not limited thereto. For example, the pitch P can be in a range from 0.15 mm to 0.35 mm, and it is possible to obtain a predetermined effect as long as the pitch P is in this range.

The dark portion 20 is configured to look black by darkening the space between the adjacent ridges 32. However, when the pitch P between the adjacent ridges 32 exceeds 0.3 mm, an effect in which the dark portion 20 looks black due to the space between the ridges 32 starts to be decreased, and when the pitch P exceeds 0.35 mm, this effect is significantly decreased. In addition, when the pitch P is less than 0.15 mm, moldability is deteriorated.

For this reason, it is preferable that the pitch P between the adjacent ridges 32 is set to be from 0.15 mm to 0.35 mm, and it is more preferable that the pitch P is set to be from 0.2 mm to 0.3 mm.

The wall surfaces 32A of both sides of the ridge 32 are inclined, and an angle θ formed by facing wall surface 32A in the adjacent ridges 32 is set to be from 15° to 40°. It is more preferable that the angle θ is set to be from 15° to 30°.

Here, when the angle θ formed by the wall surfaces 32A of the ridges 32 is less than 15°, it is easy for the ridges 32 to be deformed and collapse. Meanwhile, when the angle θ formed by the wall surfaces 32A of the ridges 32 exceeds 30°, a ratio in which reflected light from the wall surfaces 32A is emitted from the dark portion 20 is increased, and when the angle θ exceeds 40°, a ratio in which reflected light from the wall surfaces 32A is emitted from the dark portion 20 is significantly increased.

For this reason, it is preferable that the angle θ formed by the wall surfaces 32A of the adjacent ridges 32 is set to be from 15° to 40°, and it is more preferable that the angle θ is set to be from 15° to 30°.

(Action and Effect)

Next, an action and effect of the tire 10 according to the present embodiment will be described. On the tire side portion 12 or the groove bottom 28A of the circumferential groove 28 of the tread 26, the first mark portion 14, the second mark portion 16, and the third mark portion 18 that form the representation are provided. Each of the dark portions 20 which configure the first mark portion 14, the second mark portion 16, and the third mark portion 18 includes the pattern portion 30 in which the ridges 32 including the ridgelines CL having the shape along a circle when viewed on a plane and having the height H from 0.3 mm to 0.4 mm are arranged in the nest shape.

For this reason, when light is incident to the wall surfaces 32A of the ridges 32, in parts in which an extending direction of the wall surfaces 32A is almost perpendicular to an incident direction of the light, the number of times of reflection of the light between the wall surfaces 32A is increased as shown by an arrow M in FIG. 3, such that an attenuation effect of the light is high, and these portions look black. In addition, in parts in which an extending direction of the wall surfaces 32A is almost parallel to the incident direction of the light, the number of times of reflection of the light between the wall surfaces 32A is decreased as shown by an arrow N in FIG. 3, such that an attenuation effect of the light is low and blackness is decreased as compared with the parts in which the extending direction of the wall surfaces 32A is almost perpendicular to the incident direction of the light. A strong contrast is generated in reflected light from the pattern portion 30 by controlling the reflection of the light as described above, such that the pattern portion 30 appears to emit brilliance from the center of a circle regardless of a direction in which it is viewed. Therefore, visibility of the pattern portion 30 is enhanced.

For example, in FIG. 7, the second mark portion 16 where the characters are formed by the dark portion 20 (or the pattern portion 30) is shown. The characters are formed by a plurality of ridges 32 arranged on concentric circles having a center on each character. For this reason, visibility of each character is enhanced. It should be noted that the second mark portion 16 is configured by the plurality of characters in the present embodiment, but may be configured by a single character such as an initial letter of a mark to further emphasize the visibility. In addition, the second mark portion 16 may be configured by various figures such as emblems and symbols, in addition to the characters.

In addition, for example, in FIG. 8, the first mark portion 14 in which the dark portion 20 (or the pattern portion 30) is formed so as to surround a character group (that is, a plurality of characters) formed by the bright portion 22 is shown. All of the ridges 32 are arranged on concentric circles, and form the background of the character group. For this reason, visibility of the entire character group is enhanced, and designability allowing a viewer to recognize the character group as a bundle of phrase is given. For this reason, by allowing the character group to configure a mark such as a brand name or a company name, it is possible to attract attention of the viewer.

In addition, since the tire 10 is a rotating body, positions of the first mark portion 14 and the second mark portion 16 move around the center of the tire, which is a rotation axis. However, since the ridges 32 which configure the pattern portions 30 of the first mark portion 14 and the second mark portion 16 include the ridgelines CL having the shape along a circle when viewed on a plane, the pattern portions 30 appear to emit brilliance from the center of the circle regardless of the positions of the first mark portion 14 and the second mark portion 16 and regardless of a direction in which the pattern portions 30 are viewed. Therefore, visibility of the pattern portions 30 is high.

Further, since the pattern portions 30 are configured by the ridges 32, rubber easily flows into a mold for molding the tire as compared with, for example, a case in which the pattern portions are configured by fibrous protrusions. Therefore, moldability of the pattern portions 30 is high.

In addition, the pitches P between the adjacent ridges 32 are configured to be equidistant from 0.2 mm to 0.3 mm. For this reason, as compared with a case in which the ridges 32 are arranged so that adjacent intervals therebetween are uneven, the ridges 32 can be densely arranged. In this way, it is possible to allow the parts where the extending direction of the wall surfaces 32A is almost perpendicular to the incident direction of the light to look blacker.

The wall surfaces 32A of the ridge 32 are inclined, and the angle θ formed by the facing wall surface 32A in the adjacent ridges 32 is set to be from 15° to 40°.

When the angle formed by the wall surfaces is larger than 15°, a ratio in which the reflected light from the wall surfaces returns from a space between the ridges to the outside is increased, such that improvement of visibility is suppressed. That is, the light is reflected, such that a difference in contrast with the bright portion is reduced, thereby suppressing the improvement of the visibility. In addition, since the angle formed by the wall surfaces is set to be from 15° to 40°, it is easy to die cut the tire at the time of manufacturing the tire, such that the moldability is improved. As a result, collapse of the ridges is reduced, and durability of the ridges is improved. Meanwhile, when the angle θ is smaller than 15°, the ridges easily collapse. In addition, when the angle θ exceeds 40°, a ratio in which the reflected light from the wall surfaces 32A is emitted from the dark portion 20 becomes significantly large. For this reason, it is possible to negotiate the visibility while maintaining shapes of the ridges.

In addition, the top portion 32B of the ridge 32 is the vertex having the pointed shape. For this reason, as compared with, for example, a case in which the top portion 32B is formed as a flat surface, it is possible to suppress the reflected light from being directly viewed. For this reason, it is possible to improve the visibility by increasing a contrast of the pattern portion 30. It should be noted that the top portion 32B of the ridge 32 is the vertex having the pointed shape in the present embodiment, but the embodiment of the disclosure is not limited thereto. For example, the top portion may have a curved surface shape such as an arc shape. It is possible to suppress the reflected light from being directly viewed even though the top portion has the curved surface shape.

In the abovementioned embodiment, only a case in which the wall surfaces 32A of the ridge 32 extend in the straight line shape from the top portion 32B toward the base portion 32C as shown in FIG. 6 has been described. However, the embodiment of the disclosure is not limited thereto, and the wall surfaces 32A may extend in a curved line shape from the top portion 32B to the base portion 32C or may be bent in a polygonal line shape, a zigzag shape, or the like. In this case, a reflection direction of the light is not constant as compared with a case where the wall surfaces 32A extend in the straight line shape, and the reflected light is scattered between the wall surfaces 32A. Therefore, it is possible to approximate manners of viewing the reflected light in the parts in which the extending direction of the wall surfaces 32A is almost perpendicular to the incident direction of the light and the parts in which the extending direction of the wall surfaces 32A is almost parallel to the incident direction of the light to each other.

In addition, in the present embodiment, the base portion 32C is a part at which the wall surface 32A, which is a plane, and the step surface 12B, which is a plane, intersect each other, and is formed to be bent in a polygonal line shape when viewed from a cross section in a direction orthogonal to the extending direction of the ridge 32, but the embodiment of the disclosure is not limited thereto. For example, the base portion 32C may be formed so as to draw a curve line when viewed from the cross section in the direction orthogonal to the extending direction of the ridge 32. That is, the wall surface 32A and the step surface 12B may be connected by the base portion 32C having a curved surface shape. Alternatively, the step surface 12B may be formed in a curved line shape. The ridges 32 are formed as described above to suppress the reflection of the light, such that it is possible to increase the contrast of the pattern portion 30 and increase the visibility of the pattern portion 30.

Second Embodiment

Figure 4:
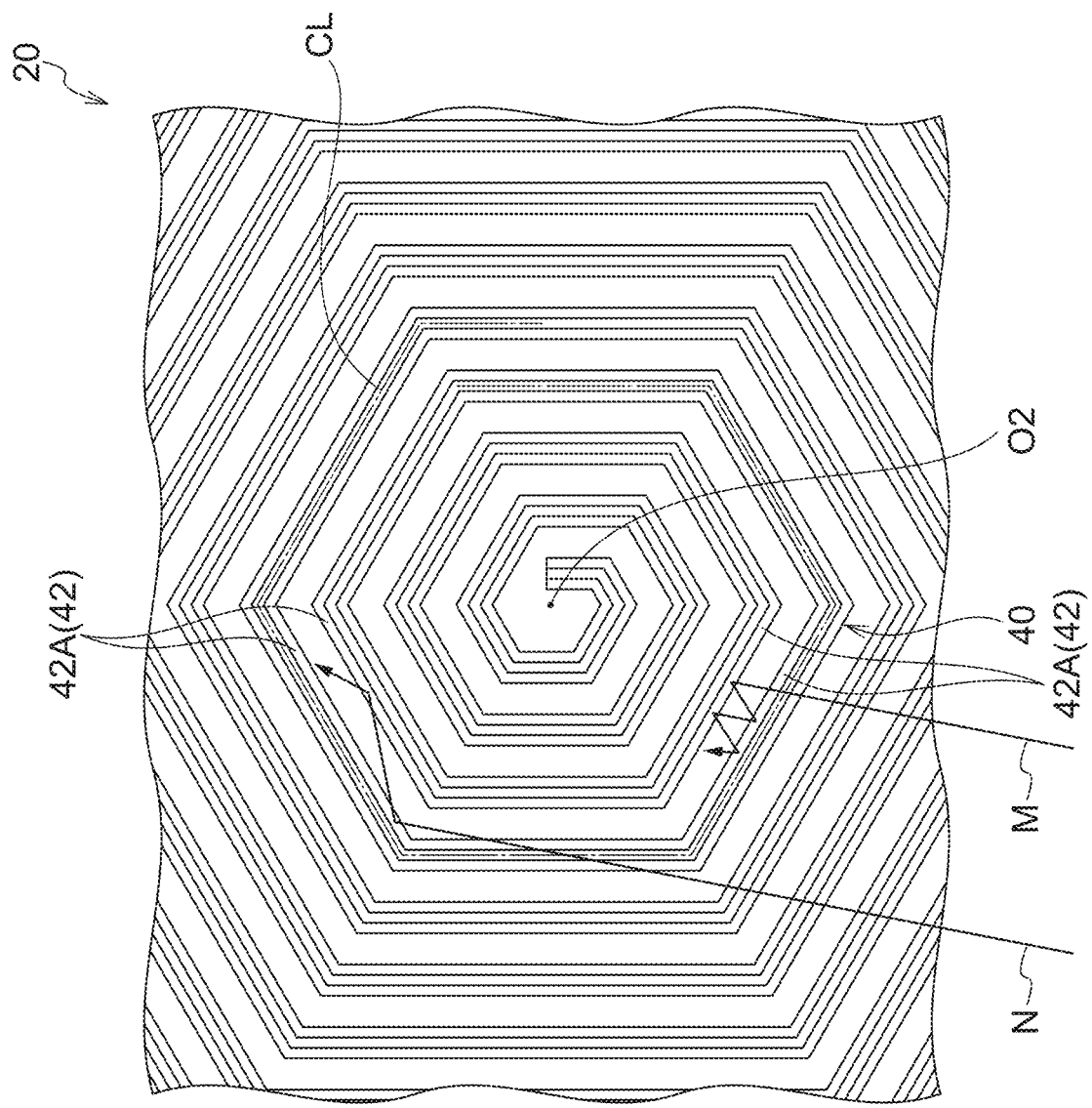
FIG. 4 is a plan view showing an example of a dark portion of a tire according to a second embodiment of the disclosure.

Next, a second embodiment of the disclosure will be described. The same reference numerals are given to the same components as those of the first embodiment, and a description thereof will be appropriately omitted. In FIG. 4, a dark portion 20 in the second embodiment is shown.

Ridges 42 according to the second embodiment include ridgelines CL formed in a hexagonal spiral shape around a point O2 when viewed on a plane, and a pattern portion 40 is configured by the ridges 42 continued in a spiral shape.

For this reason, when light is incident to wall surfaces 42A of the ridges 42, in parts in which an extending direction of the wall surfaces 42A is almost perpendicular to an incident direction of the light, the number of times of reflection of the light between the wall surfaces 42A is increased as shown by an arrow M in FIG. 4, such that an attenuation effect of the light is high, and these portions look black. In addition, in parts in which an extending direction of the wall surfaces 42A is almost parallel to the incident direction of the light, the number of times of reflection of the light between the wall surfaces 42A is decreased as shown by an arrow N in FIG. 4, such that an attenuation effect of the light is low and blackness is decreased as compared with the parts in which the extending direction of the wall surfaces 42A is almost perpendicular to the incident direction of the light. A strong contrast is generated in reflected light from the pattern portion 40 by controlling the reflection of the light as described above, such that the pattern portion 40 appears to emit brilliance from the center of a spiral regardless of a direction in which it is viewed. Therefore, visibility of the pattern portion 40 is enhanced.

As described above, the pattern portion in the embodiment of the disclosure includes a case in which the pattern portion is formed by the ridges (for example, the ridges 42 according to the present embodiment) in which the ridgelines extending in the polygonal shape and similar ridgelines extending adjacent to outer circumferences of the ridgelines and having the polygonal shape are continuously arranged in the spiral shape, in addition to an aspect in which the ridges (for example, the ridges 32 according to the first embodiment) drawing closed figures that do not have end portions are arranged in the nest shape.

Figure 5:
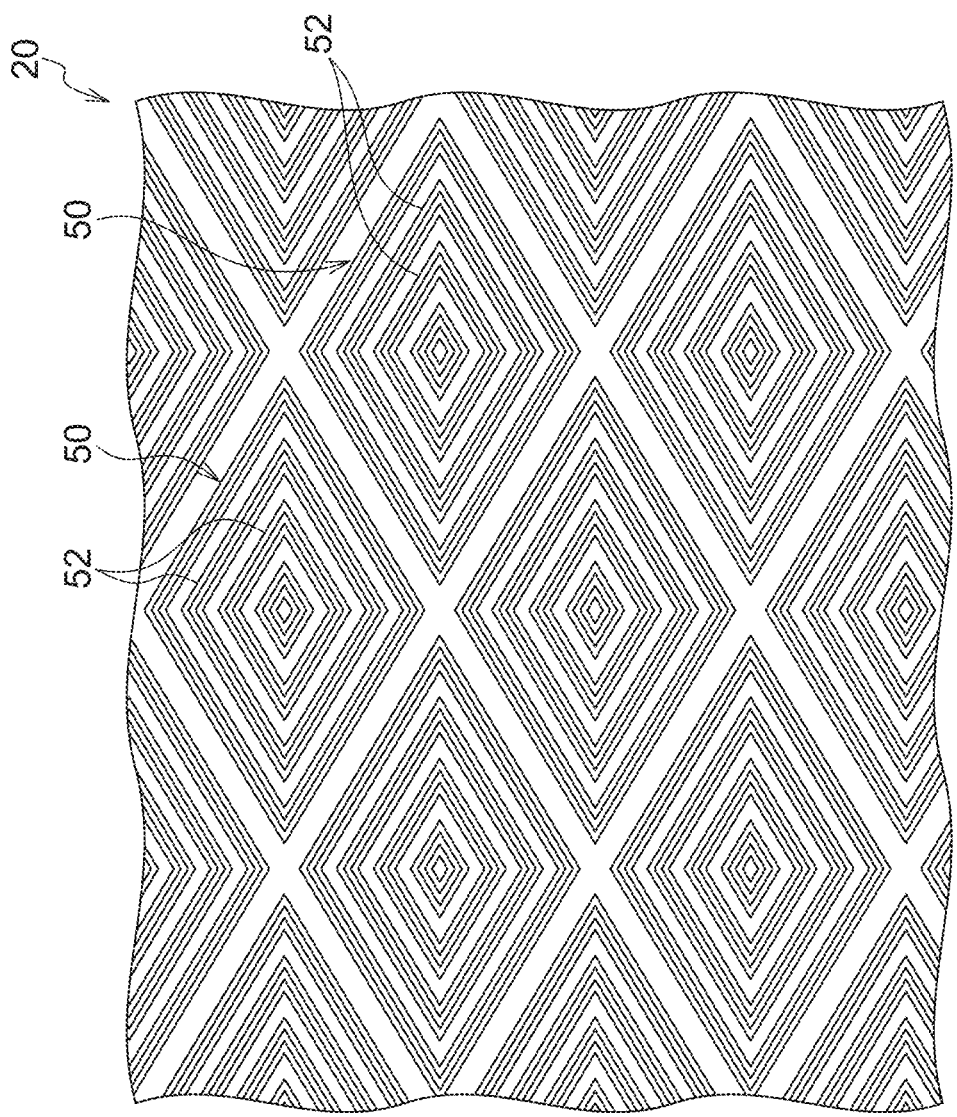
FIG. 5 is a plan view showing a modified example of the dark portion of the tire according to the embodiment of the disclosure.

In addition, in FIG. 5, a modified example of the embodiment of the disclosure is shown. As shown in FIG. 5, in a dark portion 20, a plurality of pattern portions 50 configured by ridges 52 arranged in a nest shape are arranged adjacent to each other. As described above, the dark portion 20 may be configured by the plurality of pattern portions. Visibility of the pattern portions is also enhanced by such a configuration.

<Test Examples>

In order to demonstrate an effect of the disclosure, the following tests 1 to 3 were performed.

(Test Condition)

As test tires, tires having a size of 205/55R16 and a cross section height SH of 114 mm were used.

In each of the test tires, the first mark portion 14 was provided. In the dark portion 20 which configures the first mark portion 14, the height H of the ridge 32, the pitch P between the adjacent ridges 32, and the angle θ formed by the wall surface 32A of the adjacent ridges 32 were set to 0.35 mm, 0.2 mm, and 25°, respectively, as reference values. In each test, an evaluation test was conducted using test tires having values shown in Tables 1 to 3 as the height H, the pitch P, or the angle θ.

(Test Method)

In the test, visibility when the dark portion 20 of the first mark portion 14 was viewed from each direction was evaluated. First, each test tire was assembled to an application rim. Then, twenty viewers observed each test tire, and a questionnaire survey as to whether the dark portion 20 looks blacker than a usual tire was performed on the twenty viewers. Survey results are shown as "visibility" in Tables 1 to 3 (see FIGS. 9 to 11).

In addition, in the test, generation of bare for protrusions which configure a pattern portion of each test tire was evaluated with the naked eyes, and moldability of the pattern portion was evaluated using a generation rate of bare in the pattern portion as an index. Evaluation results are shown in Table 1 to 3 as "moldability". In Tables 1 to 3, the moldability of the pattern portion was represented by A in a case in which the generation rate of the bare is less than 0.1%, was represented by B in a case in which the generation rate of the bare is from 0.1% to less than 0.3%, and was represented by C in a case in which the generation rate of the bare is 0.3% or more.

In each table, a case in which the number of viewers answered that the dark portion 20 looked clearly black was 18 or more was evaluated as A, a case in which the number of viewers answered that the dark portion 20 looked clearly black was from 10 to 17 was evaluated as B, and a case in which the number of viewers answered that the dark portion 20 looked clearly black was 9 or less was evaluated as C. In each table, the number of viewers answered that the dark portion 20 looked clearly black was also shown. In addition, a "protruding height", a "center interval", and an "angle" in each table correspond to a "height H", a "pitch P", and an "angle θ" to be described below, respectively.

(Test 1)

In Test 1, as shown in Table 1 of FIG. 9, Tires 1 to 6 in which the height H of the ridge 32 is changed were prepared and tested. Except for the height H, the abovementioned reference values were used.

As shown in Table 1, it was confirmed that the visibility is improved when the height H is in a range from 0.2 mm to 0.5 mm and the visibility is further improved when the height H is in a range from 0.3 mm to 0.4 mm. In addition, it is confirmed that the moldability is improved when the height H is in a range of 0.5 mm or less, and the moldability is further improved when the height H is in a range of 0.4 mm or less. In Tires 5 and 6, the pitch P was set to 0.3 mm in order for the angle θ formed by the wall surface 32A of the ridges 32 to be 25° and for the heights H to be 0.5 mm and 0.6 mm, respectively.

(Test 2)

In Test 2, as shown in Table 2 of FIG. 10, Tires 1 to 7 in which the pitch P between the ridges 32 is changed were prepared and tested. Except for the pitch P, the abovementioned reference values were used.

As shown in Table 2, it was confirmed that the visibility is improved when the peak P is in a range from 0.15 mm to 0.35 mm and the visibility is further improved when the peak P is in a range from 0.2 mm to 0.3 mm.

(Test 3)

In Test 3, as shown in Table 3 of FIG. 11, Tires 1 to 7 in which the angle θ formed by the wall surfaces 32A of the adjacent ridges 32 is changed were prepared and tested. Except for the angle θ, the abovementioned reference values were used.

As shown in Table 3, it was confirmed that the visibility is improved when the angle θ is in a range from 15° to 40° and the visibility is further improved when the angle θ is in a range from 15° to 30°.

The disclosure of Japanese Patent Application No. 2016-011878 filed on Jan. 25, 2016 is hereby incorporated by reference in its entirety. All documents, patent applications, and technical standards mentioned in the present specification are hereby incorporated by reference to the same extent as a case in which individual documents, patent applications, and technical standards are specifically and individually indicated to be hereby incorporated by reference.

The invention claimed is:

1. A tire comprising
a pattern portion on a tire surface and in which ridges are arranged in a polygonal spirals about a common center point, the ridges including ridgelines having straight portions in plan view, wherein
the straight portions of adjacent ridges are parallel,
a height of each of the ridges is from 0.2 mm to 0.5 mm, and
the adjacent ridges are arranged at a constant pitch of from 0.15 mm to 0.35 mm.

2. The tire according to claim 1, wherein the spirals are concentric.

\* \* \* \* \*